United States Patent
Zhao

(10) Patent No.: US 9,123,065 B2
(45) Date of Patent: Sep. 1, 2015

(54) DIGITAL WALLET BROADCASTING

(75) Inventor: Lucy M. Zhao, Austin, TX (US)

(73) Assignee: EBAY INC., San Jose, CA (US)

( * ) Notice: Subject to any disclaimer, the term of this patent is extended or adjusted under 35 U.S.C. 154(b) by 399 days.

(21) Appl. No.: 13/590,960

(22) Filed: Aug. 21, 2012

(65) Prior Publication Data

US 2014/0058870 A1 Feb. 27, 2014

(51) Int. Cl.
*G06Q 30/00* (2012.01)
*G06Q 30/06* (2012.01)
*H04L 29/08* (2006.01)
*G06Q 20/12* (2012.01)
*G06Q 20/36* (2012.01)

(52) U.S. Cl.
CPC ............... *G06Q 30/06* (2013.01); *G06Q 20/12* (2013.01); *G06Q 20/363* (2013.01); *H04L 67/30* (2013.01)

(58) Field of Classification Search
CPC ........................................ G06Q 30/00

USPC ......................................................... 705/26.1
See application file for complete search history.

(56) References Cited

U.S. PATENT DOCUMENTS

2013/0346302 A1* 12/2013 Purves et al. .................... 705/40

* cited by examiner

*Primary Examiner* — Mila Airapetian
(74) *Attorney, Agent, or Firm* — Haynes and Boone, LLP

(57) ABSTRACT

A service provider generates a customer key and a merchant key for facilitating efficient provision of assistance, by the merchant, with the customer's shopping and payment, via customer-merchant key coupling. When a customer approaches or enters a merchant's store the customer has signed up with, the user device carried by the customer wirelessly broadcasts a signal for the customer key unique to the merchant key. When the merchant server picks up the signal, the service provider communicates to the merchant server information in the user's profile including identifiers, shopping preferences, or the shopping history of the customer, subject to any user-created restrictions contained in the profile so that a sales clerk of the store may approach the customer to give recommendations, suggestions, or other assistance with shopping, based on the information.

24 Claims, 4 Drawing Sheets

DIGITAL WALLET BROADCASTING

BACKGROUND

1. Field of the Invention

The present invention generally relates to consumer shopping, and in particular, to assisting a consumer, via a customer-merchant key coupling, with offline shopping and electronic payment transaction.

2. Related Art

The advent of mobile devices equipped with almost the full-blown power and capacity of personal computers such as smart phones, iPod, tablets, etc., changed significantly the landscape of shopping, not only in an area of making payments, but also in other areas by a number of new methods and tactics previously unimaginable and inapproachable in the conventional shopping modes. When shopping online or offline store, a consumer was typically provided numerous options for payment, such as cash, check, debit card, and credit card. However, as more and more consumers are using smart phones, they may be less inclined to pay with such funding sources as a physical wallet or purse. Furthermore, such funding sources may be unsafe or unsecure, e.g., possibility of a consumer losing cash, credit cards or check forgeries.

Payment providers, such as PayPal, Inc. of San Jose, Calif., offer payment services to consumers with added security. As such, an increasing number of consumers are using third party payment providers to make payments. Such a trend is especially prevalent with online transactions. The third party payment providers can be easily accessed from a device such as PCs, smart phones, or tablets via an installed application therein, and used for payment from the accounts of customers with them. Further, such third party payment providers can provide useful services, using smart phones of the consumers who have an account with them and their servers connected thereto, for the benefit and convenience of both the merchants and the customers.

At times consumers suffer difficulties, and even feel frustration, during shopping while wandering about in the store, not knowing what to buy and/or which item(s) to choose out of so many choices. Many such difficulties come from lack of accurate information on quality, brands, prices, reputations or user's evaluations of products. Sometimes customers need advice on selecting suitable items as gifts to their families or friends or on better options or alternatives from someone with more experience and knowledge. Finding store clerks and asking for their opinions may help, but in many occasions, they may be hard to reach. Or, some customers may feel it too awkward or cumbersome to approach them, explain all the special circumstances under which the customer is searching for particular items, and seek their recommendations.

Therefore, a need exists to provide consumers a way to obtain professional opinions or guidance in shopping, more easily and conveniently, from someone, such as store sales clerks, who happens to be already equipped with the knowledge of each consumer's individual shopping preferences or special needs.

DETAILED DESCRIPTION

Figure 1:
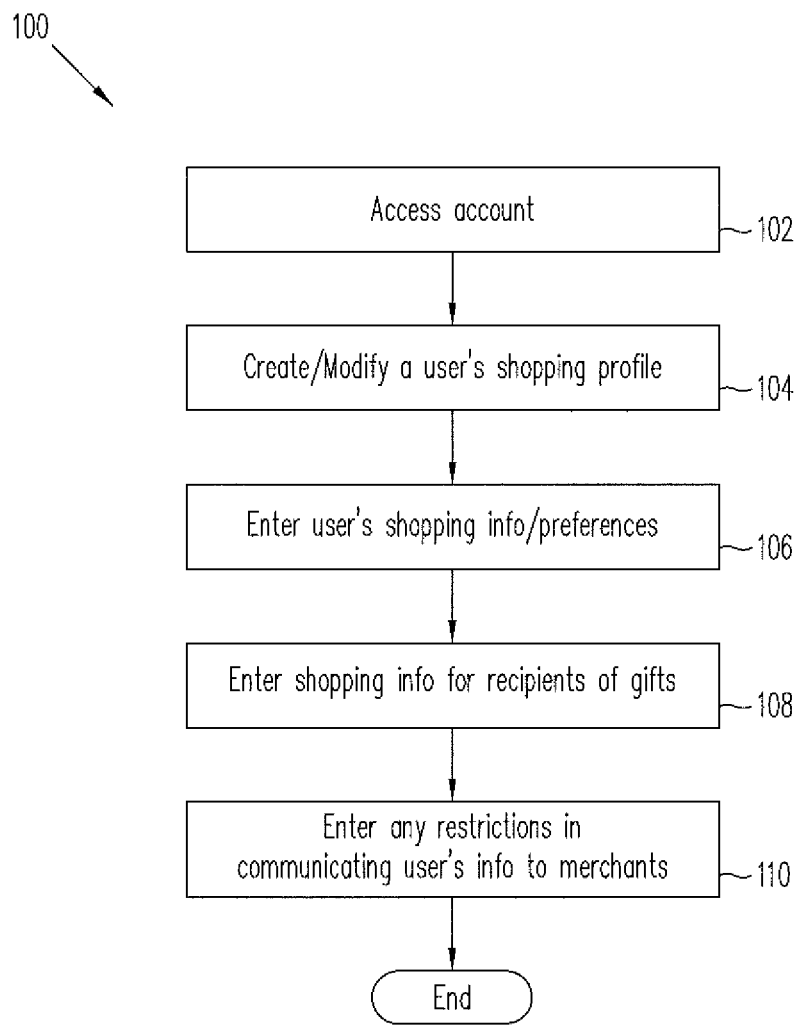
FIG. 1 is a flowchart showing a process a user or a customer performs in setting up or modifying a user's shopping profile with a user account with a service or payment provider according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

FIG. 1 is a flowchart showing a process 100 a user or a buyer performs in setting up or modifying a user's shopping profile with a user account with a service or payment provider, such as PayPal, Inc. of San Jose, Calif., according to one embodiment. The user may access, at step 102, the account through a user device, such as a PC, smart phone, tablet, or other suitable device. Accessing may include entering any requested identification and/or authentication information, such as a user name, email address, name, phone number, password, PIN, pass code, etc. The authentication information may be specified by the payment provider in one embodiment. The user may enter the authentication information in different ways, including through a user contact or address book on the user device, through a user's social network, through manually entering the identifier onto a field via a device keyboard or keypad, or speaking the identifier into a device microphone.

Once the user has been authenticated, the user may be directed to a home page of the payment provider or user account. On the page, there may be an option to access, create or modify a user' shopping profile. The option may be presented as a tab, button, or link the user can select. To create the user' shopping profile by the process 100, at step 104, the user taps or clicks on the tab, button, or link on the user device through a touch screen or mouse.

The user may then see a screen on the user device having instructions and/or fields for the user to select or enter, at step 106, information into for setting up the user's own shopping profile. The user may enter or modify the information either by tapping, clicking on tabs, buttons on the screen of a user device, typing into fields through a device keyboard or keypad, or speaking it into a device microphone. Examples of requested information include, but are not limited to, the age, sex, size, marital status, hobbies of the user, and likes and dislikes of the user in shopping such as types of products, colors, merchants, styles, brands, price ranges, etc., and preferred payment method, credit card information, bank information, shipping method and addresses. In an embodiment, such information may be requested separately for different seasonal holidays like Christmas, Hanukah, Valentine's Day, Easter, Chinese New Year, or personal celebration days like a birthday, an anniversary (wedding, work, etc.) of the user, a relative, or a best friend, and a baby shower, a bridal shower, and so on.

Further, at step 108, the page may provide the user with an option to enter the same kind of information for potential recipients of gifts from the user as well. Such information again may include not only the personal profiles and the shopping preferences of each potential recipient entered to the best of the user's knowledge, but any personal celebration days of the potential recipients.

At step 110, the user may further set restrictions such that for a particular merchant, only some chosen information in the user's shopping profile may be transmitted to, or accessed by, the particular merchant when a customer/merchant key coupling (as described below) occurs.

In one embodiment, the user's shopping profile may consist, not only of the information and restrictions entered by the user through the process 100, but of information from the user's past shopping history. Such information may include the kinds, prices, sizes, colors, brands, manufacturers, sellers/merchants of products the user purchased, and the specific time of the season when the purchases were made.

The user can view the information entered into the user' shopping profile at each step, and when no more information is to be added, the user is notified to confirm or modify, if desired, any information. Note that one or more of the steps above can be combined with one or more steps, omitted, and/or performed in a different sequence. After finishing the process, the data of the user' shopping profile are stored or associated with the user account on the payment provider.

Figure 2:
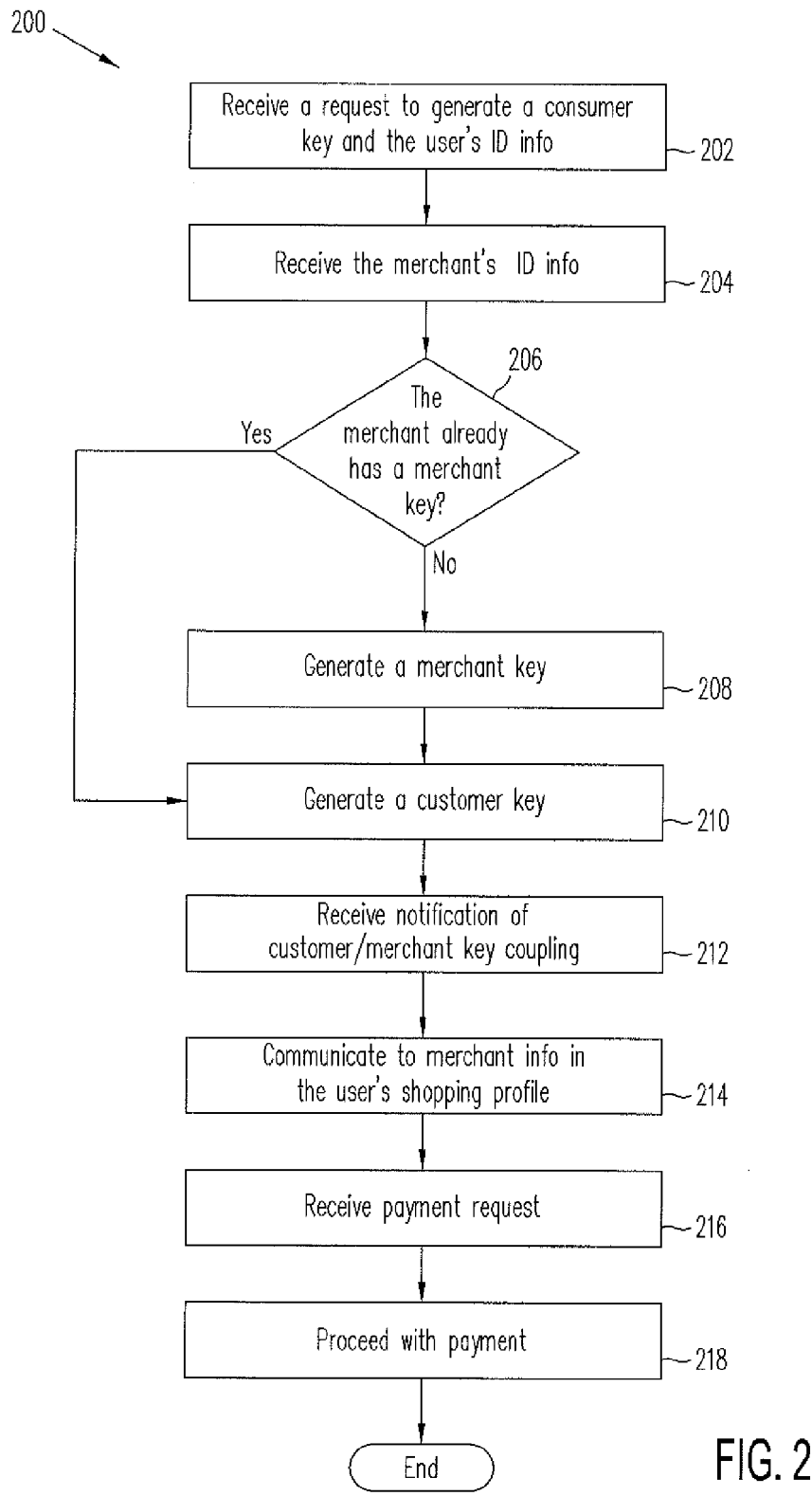
FIG. 2 is a flowchart showing a process a service or payment provider performs, in signing up a customer and a merchant for a customer/merchant key coupling and facilitating efficient provision of assistance, by the merchant, with the customer's shopping and payment, according to one embodiment.

FIG. 2 is a flowchart showing a process 200 a service or payment provider, such as PayPal, Inc. of San Jose, Calif., performs, in signing up a customer and a merchant for a customer-merchant key coupling, and facilitating efficient provision of assistance, by the merchant, with the customer's shopping and payment, according to one embodiment. To process payment transactions through the payment provider, both the customer and the merchant for whom the key coupling is set up may have their own respective accounts with the payment provider. At step 202, the payment provider receives a request to create a customer key from a user who has an account with the payment provider, together with identification information of the user, and accesses the user's account.

For the payment provider to create the customer/merchant keys for mutual coupling, both the customer and merchant have to sign up for the keys either at the same time or separately at a different time. Once the customer agrees to sign up for a customer-merchant key coupling, in one embodiment, the merchant or a service provider may install a user application on the user device, such as a mobile phone, a tablet, iPad, or other suitable handheld devices that have capability of wireless communication. In another embodiment, the user device may have already a pre-installed user application by which the user accesses the account with the payment provider, and that application may provide the capability of signing up the user for a customer-merchant key coupling. In the latter case, there is no need of installing a new application on the user device at the merchant's store.

The user application may be a subsidiary application of a single integrated master application of the payment provider, and may be developed either by the payment provider or by a third party. It may provide instantaneous wireless communication to the payment provider as well as to the merchant server such as a merchant's server or computer system during the process of signing up the customer-merchant key coupling Through the user application, the user may also access the user' shopping profile that may have been previously created and stored in, or associated with, the user's account, and modify it any time if desired.

Signing up a customer and a merchant for a customer-merchant key coupling, by the payment provider, may be initiated by sending a key generation request, at step 202, to the payment provider via the user application on the user device, which may have been either newly installed at a merchant location or pre-installed. The customer may make the request by tapping or clicking on, for instance, a tab or menu bar reading, "sign up for a customer key," in the user application. The user application may, in one embodiment, request the user to provide identification and/or authentication information such as a user name, email address, name, phone number, password, PIN, pass code, etc., which the user may enter by a suitable entry means such as a touch screen, mouse, keypad, or keyboard. Such identification and/or authentication information of the user, when entered into the user application, may be transmitted to the payment provider at step 202 if the user is not already logged in, together with the request to generate a customer key.

Once the identification of the user is verified, at step 204, the payment provider may determine, through the user application, the identification and/or authentication information of the merchant with which the user is signing up for the customer-merchant key coupling. In one embodiment the merchant's identity may be entered and transmitted to the payment provider directly from the user device. For example, the user device may have GPS capability, and when the customer activates the "sign up for a customer key" tab, the user application may locate the merchant using GPS, and pull up and transmit all necessary information about the merchant to the payment provider. Or, the user application may request the user to enter the identification of the particular merchant that the user is currently signing up with. The customer may receive from the merchant its unique identifier, assigned to it by the payment provider, and enter it into a field on the user application by suitable entry means. In another embodiment, the user application may pop up a window listing all merchants affiliated with the payment provider or having accounts therewith, for the customer to select one. In an embodiment where the customer can select a particular merchant on the user device for signing up customer-merchant key coupling, the customer can create different customer keys for multiple different merchants using the same user application.

In another embodiment, the request to generate a customer key may be transmitted to the payment provider together with the user's identification and/or authentication information from a merchant server through a merchant application installed therein. Like the user application, the merchant application may enable the merchant to communicate with the payment provider for signing up the user for the customer-merchant key coupling, and also be a subsidiary application of a single integrated master application in the payment provider.

In this case, the transmission of the key generation request may be achieved by, for instance, tapping or clicking on a tab or menu bar reading, "generate a customer key," in the merchant application, and the user's authentication information may be entered either by user's telling the store clerk the user's account number to enter, by user's own typing the relevant information into the provided field in the merchant application, or by user's swiping an ID card, for instance, into the merchant's system. In the embodiment, the identification information of the merchant is directly transmitted from the merchant server to the payment provider.

Now, at step 206, the payment provider may determine whether the merchant with which the user wishes to sign up has a merchant key already generated and stored in the merchant server. The generation of merchant key may be done through the merchant application either any time independently from the generation of the customer key, or at the same time when the customer key is generated at the sign up stage. If the payment provider determines that the merchant with which the user wishes to sign up has a merchant key already generated, it may generate, at step 210, a customer key unique to the user as well as to the merchant or merchant key. The customer key, once generated, may be associated with the user account and transmitted over the wireless network to both the user device and the merchant server and stored therein, as well as in the payment provider server.

If the payment provider determines that the merchant with which the user wishes to sign up does not have a merchant key yet, it generates, at step 208, a merchant key and transmits it over the wireless network to the merchant server and stores it therein as well as in the payment provider server.

In one embodiment, both the customer and the merchant keys may be electronic or digital codes comprising characters, numbers, or other electronic data uniquely identifying the customer and the merchant respectively, by which the merchant may recognize the presence of the customer through wireless communication between the user device and the merchant server.

The actions of a customer and a merchant involved in the steps from 202 to 210 of the process 200 were described hitherto as occurring at a sign up table in the merchant's store. Such sign up between a merchant and a customer, however, need not happen always at a merchant's store. In one embodiment, the customer may open the user application at home, where the application may have the list of merchants enabled for the customer-merchant key coupling, and select one merchant and perform the identical procedures for signing up for the key coupling described herein in a offline store setting.

The way the customer key and the merchant key works, in one embodiment, is as follows. As soon as a customer walks into or approaches a store of a merchant with whom the customer has previously signed up for the customer/merchant key generation, the user device carried by the customer broadcasts out a wireless signal unique to the customer key stored in the user device, which is captured by the merchant's server. The wireless technology used for that purpose may be any technology employed for a relatively short-range wireless communication such that the merchant server may be able to capture the wireless broadcast of the customer key only when the user device comes in a sufficient proximity to the merchant server, e.g., not farther than the boundary of a parking ground neighboring the merchant's physical store. Such short-range wireless communication technology includes, but is not limited to, a Wi-Fi or a Bluetooth connection.

When the merchant server captures the wirelessly broadcasted signal for the customer key, it compares it with customer keys stored in the merchant server, and if the merchant server finds a match, i.e., the customer key is unique to the merchant key such that the pair forms a predetermined combination. If it does, the customer-merchant key coupling occurs and the merchant is able to immediately recognize the presence or near-presence of a particular customer in the merchant's store.

Once such a customer-merchant key coupling occurs, the payment provider may receive, at step 212, a notification of the occurrence of such a coupling. In one embodiment, such notification to the payment provider may be transmitted only from the user device so that the customer may have a control over the merchant's involvement in the customer's shopping session through customer-merchant key coupling. The customer control may be provided by a setting function in the user application. For example, the customer may choose that such notification is automatically transmitted to the payment provider whenever such a customer-merchant key coupling occurs so that the merchant may access the user's shopping profile in the customer's account, and using that information, help the customer with the shopping. Or the customer may choose that the notification is transmitted only when customer manually selects, for instance, a "transmit" tab or button in the user application after the customer is notified, on the user device through text, voice, or other means, of the occurrence of the key coupling. Or, if the customer does not want any involvement from the merchant's clerks during her or his shopping, the customer may choose, before walking into the merchant's store, to block preemptively the customer-merchant key coupling by selecting, for instance, a "deactivate" tab or button on the user application. In this case, the wireless signal carrying the customer key would not be emitted at all from the user device.

Even when choosing to allow the key coupling to happen and the merchant to access the customer's shopping profile, the customer may exercise a control over the extent and kind of the information in the user's shopping profile to be communicated to the merchant. The customer may open the user application anytime after the sign up to add or modify various restrictions in the user's profile and designate a shipping or payment method(s) for each particular merchant the customer has signed up with.

In still another embodiment, the occurrence of the customer-merchant key coupling may be automatically notified to the payment provider directly from the merchant server at the moment the coupling occurs without customer's any intervention. Even in this case, the customer may still be able to exercise a control over the kind of information on the shopping profile communicated to a particular merchant by adding/modifying beforehand restrictions in the user's shopping profile of the customer.

Once notified of the occurrence of the customer-merchant key coupling, from either the user device or the merchant server, the payment provider may communicate to the merchant, at step 214, all or selected portion of the information contained in the user's shopping profile so that the merchant, using that information, may help the customer with shopping.

In another embodiment, at step 214, the payment provider may automatically communicate to the merchant all or selected portion of the information contained in the user's shopping profile without requiring any notification from either the user or merchant of such occurrence. In this case, the customer-merchant key coupling may operate as a pre-granted authorization for the merchant to access the customer's shopping profile stored in the payment provider and acquire any of the information contain therein as needed to assist the customer with shopping whenever the customer-merchant key coupling occurs. But still, the information acquired by the merchant may be limited by any restrictions the customer may have previously placed in the user's shopping profile.

The information in the user's profile communicated to, or accessed by, the merchant at step 214 when the key coupling occurs may include: information related with the identity of the customer including age, sex, size, marital status, hobbies, and even a picture; the customer's shopping preferences such as types of products, colors, merchants, styles, brands, price ranges, etc.; shipping and payment preferences, which may have been created by the customer's own entry and the customer's past shopping history collected by the payment provider. The information may further include the customer's shopping records on special personal celebration days like a birthday, a wedding or working anniversary of the customer, a relative, or a best friend of the customer. The information transmitted to or accessed by the merchant, however, may be subject to any restrictions that the customer may place in the user's shopping profile either prior to, or at the moment of, transmitting the notification of the key coupling to the payment provider. Such restrictions may be placed on any information in the user's profile through the process 100 described herein.

When the merchant accesses to the user's profile, all or selected information contained therein about a particular customer, who just did or is going to walk into its store, may be immediately transmitted from the payment provider to the merchant server and displayed or popped up, for instance, on a merchant's computer in an ordered way by a merchant application. What is displayed on the merchant's computer may even include the customer's picture. Seeing the picture, the store sales clerk may be able to readily recognize the particular customer entering or shopping in the store, and approach the customer to provide any helpful suggestions, recommendations or advice in finding and selecting items, based on the various information the merchant acquired about the customer's shopping preferences and needs.

In one embodiment, if the picture of the customer is not included in the information transmitted to the merchant to enable a visual identification, the store clerk may still be able to locate the position of the customer inside the store via a sensor in the merchant server that can track down the source of the wireless signal of the customer key transmitted from the user device.

Once the customer-merchant key coupling occurred, (and at the end of the customer's shopping whether or not the user has been helped by the merchant with shopping) the payment provider may, at step 216, receive a payment request, either from the user device or the merchant server, to process payment for any item(s) the user decided to buy. To proceed with the payment, the payment provider needs to know the identities of both the purchaser and the merchant. This can be achieved by the transmission of the customer and merchant keys to the payment provider.

In one embodiment, the payment request may be sent from the user device by the user's selecting, for instance, a "Purchase" or "Buy" tab or button on the user application. If not already authenticated or logged in, the user may be asked to enter certain information, such as a user name, an email address, and/or a password/PIN. If partially authenticated, the user may only need to enter a password/PIN. When the user selects the "Purchase" or "Buy" tab or button on the user device after the item(s) to be purchased are scanned at a store checkout machine, the user device may transmit the customer key to the merchant server. Then the merchant server may immediately be able to associate the customer to the particular items just scanned at checkout. At the same time the user device may transmit the payment request, the customer key, and the merchant key to the payment provider as well. Receiving such transmission, the payment provider may be able to know, not only who is the purchaser, but also to whom the payment provider should pay. Then the payment provider may immediately connect to the merchant server and receive all information of the item(s) to be checked out, such as the price, brand, type, merchant/sell, and etc., and process the payment transaction.

In another embodiment, the payment request may be transmitted to the payment provider directly from the merchant server at the user's request. When the user selects of the "Purchase" or "Buy" tab or button, or even says "Pay" on the user device at the store checkout machine, the user device may wirelessly transmit a signal for the customer key, the second time, to the merchant server. The merchant server then, on picking up the customer key, may identify the customer, associate the item(s) just scanned at the checkout machine with the particular customer, and transmit the payment request, the item information (prices, kinds, etc.), the customer key, and the merchant key to the payment provider for it to proceed the payment.

In still another embodiment, the merchant machine at each checkout counter may have a sensor having a proximity sensing function that is capable of recognizing a particular user device approaching a given checkout counter via the unique customer key being broadcasted therefrom. In this case, even the picture of the customer may have been already popped up on the computer screen at the counter. Then the merchant may immediately be able to identify the customer, and associate her or him to those item(s) that are currently being checked out at that particular checkout counter.

At step 218, the payment provider processes payment transaction for the item(s) in accordance with the user's shopping profile.

Figure 3:
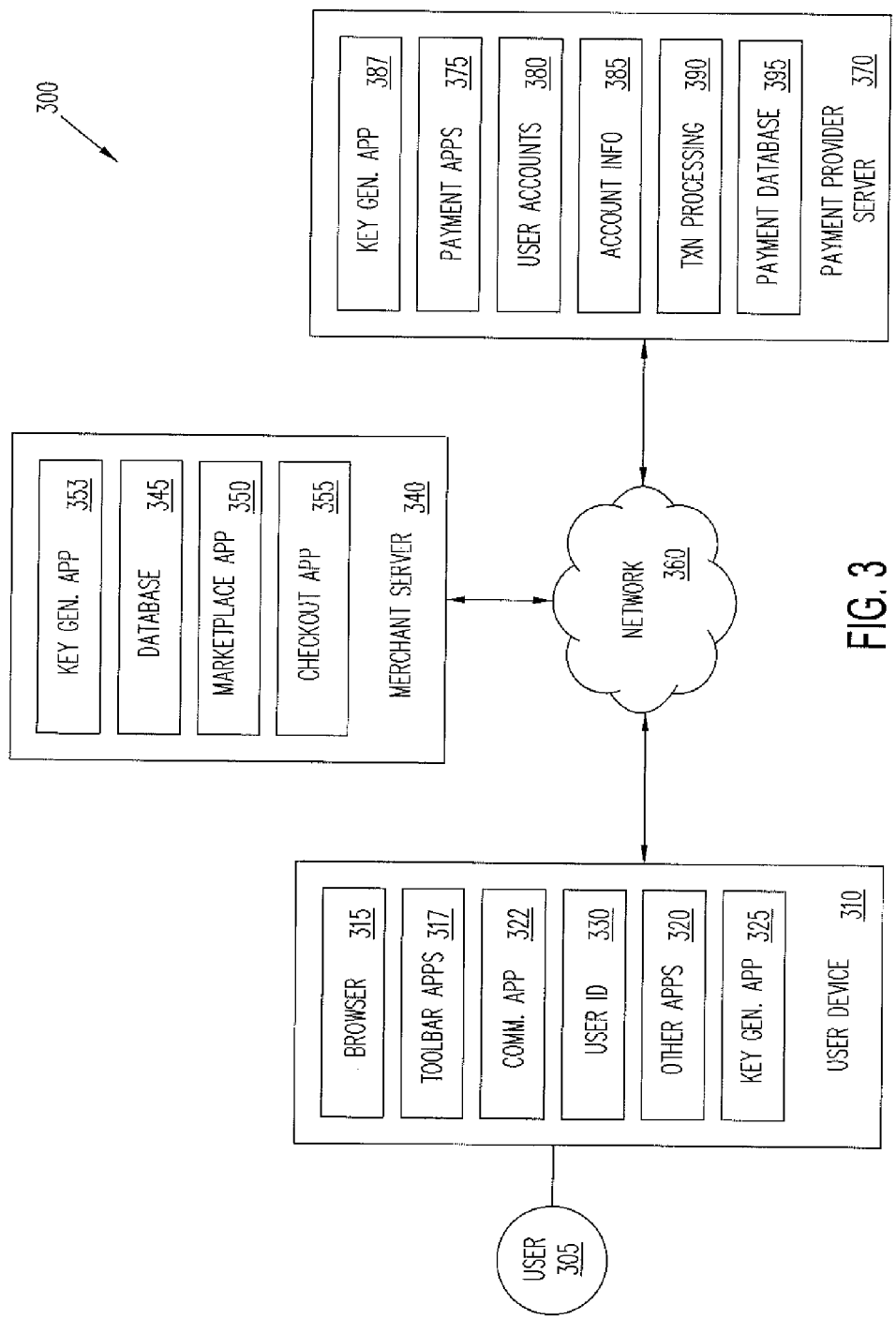
FIG. 3 is block diagram of a networked system suitable for implementing the process described herein according to an embodiment.

FIG. 3 is a block diagram of a networked system 300 configured to handle a transaction using a multi-casting funding method, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a buyer or consumer, utilizes user device 310 to perform a purchase transaction using payment provider server 370. Note that transaction, as used herein, refers to any suitable action performed using the user device, including payments, transfer of information, display of information, etc. Although only one merchant server is shown, a plurality of merchant servers may be utilized if the user is purchasing commercial items from multiple merchants.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, tablet, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, and/or access merchant sites for viewing and purchasing commercial products. User device 310 may also include one or more toolbar applications 317 which may be used, for example, to provide client-side processing for performing desired tasks in response to operations selected by user 305. In one embodiment, toolbar application 317 may display a user interface in connection with browser application 315 as further described herein.

User device 310 may further include a key generation application 325 by which the user 305 may create or modify the user's shopping profile, which may be stored in the user device 310, payment provider server 370 via network 360, or both. To create the user's shopping profile, the key generation application 325 may enable the user 305 to enter information of identifiers, shopping/shipping options and preferences of the user, or any restrictions to be placed in communicating the information contained in the user's profile to potential merchants.

The key generation application 325 may be directly linked to the user's account with the payment provider so that a user 305 may quickly access the account and check the balance in the account during shopping. It may be incorporated into the browser 315 in one embodiment such that it may be activated or populated by tapping or clicking a tab or button in the browser while the user 305 is shopping merchant's sites online. In another embodiment, especially applicable in an offline shopping situation, the key generation application 325 may be opened independently from a browser installed in the user device 310. The key generation application 325 may further enable the user 305 to transmit to the payment provider server 370 a payment request.

The key generation application 325 may also enable the user to make a request to the payment provider server 370 to create a customer key on the user device 310. In one embodiment, when the user 305 is signing up for the customer-merchant key generation at a merchant's store, the user may tap or click on, say, a key generation request tab or button in the menu bar of the key generation application 325. Then the key generation application 325 may pop up a window requesting the user 305 to enter the identification of the merchant the user is signing up with for the customer-merchant key generation by, for instance, selecting names in a list or typing the name into a field.

The key generation application 325 then may pop up another window for the user 305 to add/modify any restrictions in the user' shopping profile, stored in either or both of the user device 310 and the payment provider server 370, specific to the selected merchant.

In another embodiment, the request to the payment provider server 370 to generate a customer key on the user device 310 may be transmitted directly from the merchant server 340 to the payment provider server 370, for instance at a merchant's sign-up table, without going through the user device 310 or the key generation application 325.

User device 310 may further include other applications 320 as may be desired in particular embodiments to provide desired features to user device 310. For example, other applications 320 may include security applications for implementing client-side security features, programmatic client applications for interfacing with appropriate application programming interfaces (APIs) over network 360, or other types of applications. Applications 320 may also include email, texting, voice and IM applications that allow user 305 to send and receive emails, calls, and texts through network 360, as well as applications that enable the user 305 to communicate, transfer information, and make payments. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider as further described herein. A communications application 322, with associated interfaces, enables user device 310 to communicate within system 300.

Merchant server 340 may be maintained, for example, by a merchant or seller offering various products and/or services in exchange for payment to be received over network 360. Merchant server 340 may be used for POS or online purchases and transactions. Generally, merchant server 340 may be maintained by anyone or any entity that receives money, which includes charities as well as retailers and restaurants. For example, a purchased item may be a donation to charity in the name of the user 305. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Further, the merchant server 340 may further include a key generation application 353, which may be either incorporated into the marketplace application 350 or separate but linked with the marketplace application 350, for the purpose of providing the service of transmitting a request, with other necessary data to the payment provider, to create a customer key and a merchant key server 370 on behalf of the user 305 and the merchant. In one embodiment, the application 353 is activated when the user 505 comes to the key generation sign up table and agrees with the key-coupling. When activated, the application 353 may enable the store clerk to enter the identifiers of the user 305 to be transmitted to the payment provider server 370 for receiving the customer key. When all the required data are entered, the application 353 transmits the request to generate a customer key and a merchant key to be uniquely paired directly to the payment provider server 370.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360. For example, checkout application 355 may receive and process a payment confirmation from payment service provider server 370, as well as transmit transaction information to the payment provider and receive information from the payment provider (e.g., a transaction ID).

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services, communicate/display information, and send payments by user 305 of user device 310 and as discussed above.

Payment provider server 370 also maintains a plurality of user accounts 380, each of which may include account information 385 associated with individual users, including funders' profile created by the user 305. For example, account information 385 may include private financial information of users of devices such as account numbers, passwords, device identifiers, user names, phone numbers, credit card information, bank information, or other financial information, and shipping information which may be used to facilitate online transactions by user 305. Account information may also include a user's shopping profile. Advantageously, payment application 375 may be configured to interact with merchant server 340 on behalf of user 305 during a transaction with checkout application 355 to track and manage purchases made by users and which funding sources are used, as well as incentives for a user.

Payment provider server 370 may further include a key generation application 387, which assists the user 305 to establish a customer-merchant key coupling for facilitating the merchant's assistance with the user's shopping. The key generation application 387 may enable a user 305 to set up/modify the user's shopping profile as described hereinbefore, through an application in a user's device 310, and once done, it may associate the profile with the user's account information 385. The key generation application 387 may receive from the user 505, but either via the user device 310 or the merchant server 340, a request to create a customer key on the user device 310. The key generation application 387 may generate a customer key and the merchant key at the user's and merchant's requests and store them on the user device 310, the merchant server 340, or both.

The key generation application 387 may receive a notification that the customer-merchant key coupling has occurred according to a predetermined combination saved in the merchant server 340, and communicate to the merchant server 340 the information contained in the user's shopping profile.

The transaction processing application 390, which may be part of payment application 375 or separate, may be configured to receive a purchase request from a user device 310 and/or merchant server 340 for processing payment and storing the transaction in a payment database 395. In an embodiment, such purchase request may come to the transaction processing application 390 through the key generation application 325 in the user's device 310, or the application 353 in the merchant server 340. The transaction processing application 390 may include one or more applications to process information from user 305 for processing an order and payment using various selected funding instruments as described herein. As such, transaction processing application 390 may store details of an order associated with a phrase from individual users.

Figure 4:
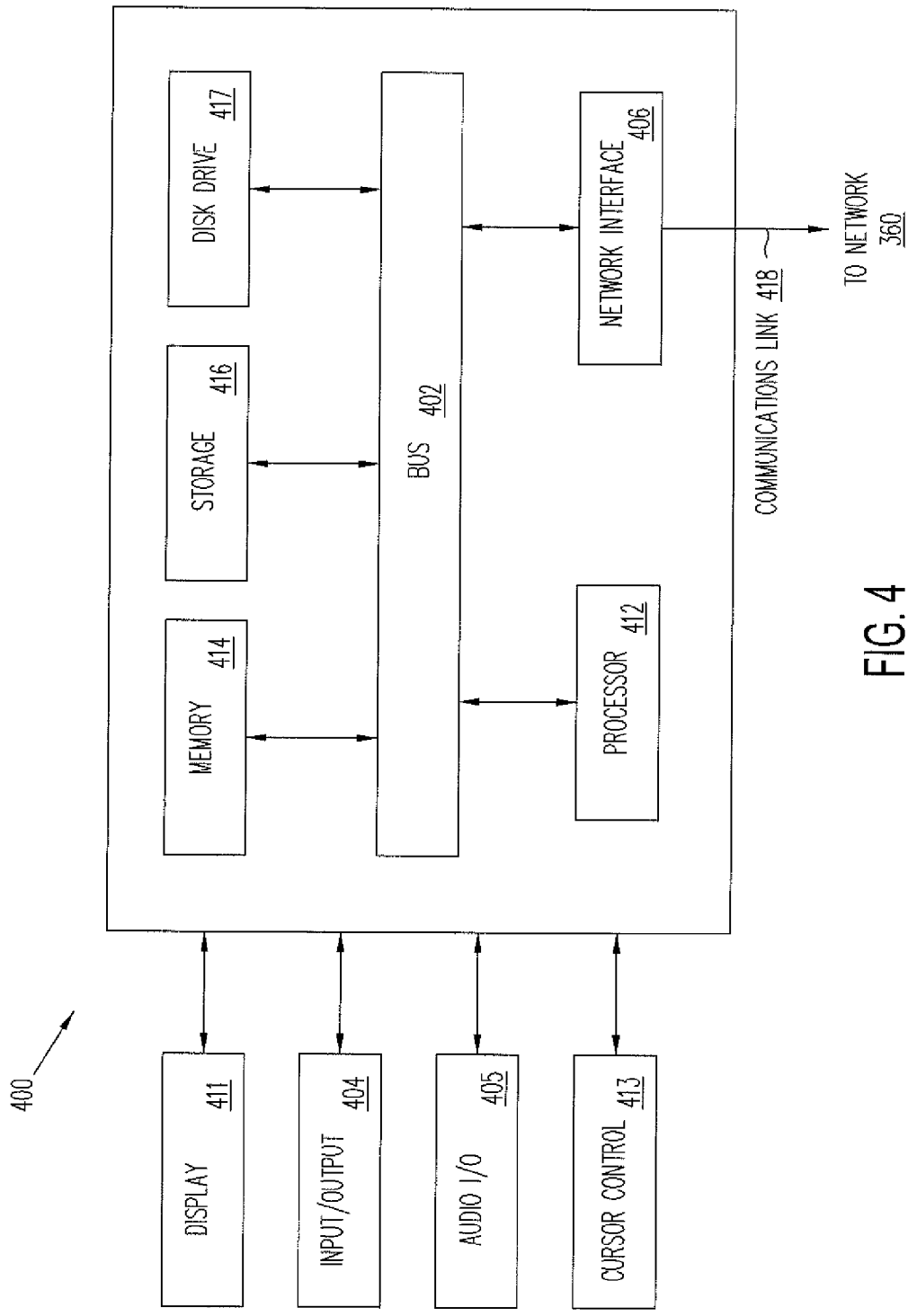
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 613 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a memory storing account information for a user, wherein the account information comprises information in a user's shopping profile, the information in the user's shopping profile comprising identifiers, shopping preferences, a shopping history of the user, and/or any user-created restrictions; and
   one or more processors in communication with the memory, the one or more processors being configured to:
      generate a customer key and a merchant key pair in response to receiving a request to generate the customer key and the merchant key;
      transmit the customer key to a user device;
      transmit the merchant key to a merchant server;
      receive a notification in response to the merchant server capturing a wireless signal unique to the customer key broadcasted from the user device; and
      communicate to the merchant server at least a part of the information in the user's shopping profile subject to the any user-created restrictions.

2. The system of claim 1, wherein the one or more processors is further configured to generate the merchant key on the merchant server.

3. The system of claim 1, wherein the one or more processors is further configured to generate the customer key on the user device in response to the key generation request.

4. The system of claim 1, wherein the key generation request is transmitted from the user device.

5. The system of claim 1, wherein the key generation request is transmitted from the merchant server.

6. The system of claim 1, wherein the merchant server captures the wireless signal unique to the customer key only when the user device is in a proximity to the merchant server.

7. The system of claim 6, wherein the wireless signal unique to the customer key is broadcasted via a Wi-Fi connection or a Bluetooth connection.

8. The system of claim 1, wherein the one or more processors is further configured to process a payment at a user's request.

9. A method comprising:
   generating, by one or more processors of a service provider, a customer key and a merchant key pair in response to receiving, by the one or more processors over a network, a request to generate the customer key and the merchant key;
   transmitting, by the one or more processors over the network, the customer key to a user device;
   transmitting, by the one or more processors over the network, the merchant key to a merchant server;
   receiving, by the one or more processors over the network, a notification a in response to the merchant server capturing a wireless signal unique to the customer key broadcasted from the user device; and
   communicating, by the one or more processors to the merchant server over the network in response to the receiving of the notification, at least a part of information in a user's shopping profile stored in a memory of the service provider, wherein the information in the user's shopping profile comprises identifiers, shopping preferences, a shopping history of the user, and/or any user-created restrictions in the communicating.

10. The method of claim 9, further comprising generating, by the one or more processors, the merchant key on the merchant server.

11. The method of claim 9, further comprising generating, by the one or more processors, the customer key on the user device in response to the key generation request.

12. The method of claim 9, wherein the key generation request is transmitted from the user device.

13. The method of claim 9, wherein the key generation request is transmitted from the merchant server.

14. The method of claim 9, wherein the merchant server captures the wireless signal unique to the customer key only when the user device is in a proximity to the merchant server.

15. The method of claim 14, wherein the wireless broadcast of signal unique to the customer key is broadcasted via a Wi-Fi connection or Bluetooth connection.

16. The method of claim 9, further comprising processing, by the one or more processors, a payment at a user's request.

17. A non-transitory machine-readable medium comprising a plurality of machine-readable instructions which, when executed by one or more processors of a server, are adapted to cause the server to perform a method comprising:
   generating a customer key and a merchant key pair in response to receiving a request to generate the customer key and the merchant key;
   transmitting the customer key to a user device;
   transmitting the merchant key to a merchant device;
   receiving a notification in response to the merchant server capturing a wireless signal unique to the customer key broadcasted from the user device; and
   communicating to the merchant server in response to the receiving of the notification at least a part of information in a user's shopping profile stored in a memory of the server, wherein the information in the user's shopping profile comprises identifiers, shopping preferences, a shopping history of the user, and/or any user-created restrictions in the communicating.

18. The non-transitory machine-readable medium of claim 17, wherein the method further comprises generating the merchant key on the merchant server.

19. The non-transitory machine-readable medium of claim 17, wherein the method further comprises generating the customer key on the user device in response to the key generation request.

20. The non-transitory machine-readable medium of claim 17, wherein the key generation request is transmitted from the user device.

21. The non-transitory machine-readable medium of claim 17, wherein the key generation request is transmitted from the merchant server.

22. The non-transitory machine-readable medium of claim 17, wherein the merchant server captures the wireless signal unique to the customer key only when the user device is in a proximity to the merchant server.

23. The non-transitory machine-readable medium of claim 22, wherein the wireless signal unique to the customer key is broadcasted via a Wi-Fi connection or Bluetooth connection.

24. The non-transitory machine-readable medium of claim 17, wherein the method further comprises processing a payment at a user's request.

* * * * *